United States Patent Office 3,842,036
Patented Oct. 15, 1974

---

3,842,036
B-STAGED POLYURETHANE-ISOCYANURATES FROM ALKYLENE OXIDE CONDENSATE OF NOVOLAK RESINS
Sui-Wu Chow, Somerville, and Markus Matzner, Edison, N.J., assignors to Union Carbide Corporation, New York, N.Y.
No Drawing. Continuation-in-part of application Ser. No. 238,588, Mar. 27, 1972, now Patent No. 3,723,367. This application Jan. 31, 1973, Ser. No. 328,369
Int. Cl. C08g 22/14, 33/02
U.S. Cl. 260—47 CB          5 Claims

ABSTRACT OF THE DISCLOSURE

Polyurethane-isocyanurates are produced from an alkylene oxide condensate of a novolak resin, an organic polyisocyanate, and a catalyst that promotes the formation of isocyanurates from isocyanates.

---

This application is a continuation-in-part of our application Ser. No. 238,588, filed Mar. 27, 1972, for "Alkali Metal Mercaptides as Urethane-Isocyanurate Catalysts," now U.S. Pat. No. 3,723,367.

The invention relates to polyurethane-isocyanurates that are produced from an alkylene oxide condensate of a novolak resin, an organic polyisocyanate, and a catalyst that promotes the formation of isocyanurates from isocyanates, and to processes for the production of said polyurethane-isocyanurates.

Polyurethanes have been produced by reacting essentially stoichiometric equivalents of an alkylene oxide condensate of a novolak with an organic polyisocyanate. For instance, see British Patent No. 1,029,033. More recently, it has been disclosed that polyurethane-isocyanurates can be produced by reacting a polyol with a significant stoichiometric excess of an organic polyisocyanate in the presence of a catalyst that promotes the formation of isocyanurate from isocyanate. Such compositions are disclosed, for instance, in U.S. Pat. No. 3,697,485. Among the polyols that have been disclosed as being useful in producing polyurethane-isocyanurates are alkylene oxide condensates of bisphenol A (in German Pat. No. 2,014,899).

The present invention is based upon the discovery that useful elastomeric to rigid thermoset compositions containing both urethane and isocyanurate groups can be produced from alkylene oxide condensates of novolak resins and organic polyisocyanates. The thermoset compositions of the invention are more thermally stable than polyurethanes produced from comparable alkylene oxide condensates of novolaks. (By "comparable," is meant a condensate that is derived from the same novolak and which has the same average polyether chain length.) Also, the thermoset compositions of the invention have a higher cross-linking density and, hence, are more rigid at elevated temperatures than the aforesaid compositions produced from bisphenol A-alkylene oxide condensates having the same polyether chain length. Therefore, the compositions of this invention develop "green strength" more rapidly than do the products derived from bisphenol A, with attendant fabrication economies.

Broadly, the thermoset compositions of the invention are produced by reacting an alkylene oxide condensate of a novolak resin with a stoichiometric excess of an organic polyisocyanate to form a urethane polymer, and either subsequent to or simultaneously with the production of said urethane polymer, some of the isocyanato groups of said organic polyisocyanate are reacted to form isocyanurate groups.

In one aspect, the invention provides a one-stage process which can be carried out as a one-step reaction wherein all the reactants and catalyst are reacted in one step to produce the thermoset composition. Alternatively, the one-stage process can be carried out as a two-step reaction wherein all or part of the reactants are pre-reacted to form an isocyanato-terminated prepolymer, which is then contacted with the catalyst and any remaining reactants to form the thermoset compositions of the reaction.

In another aspect, the invention provides a two-stage process. The two-stage process can be carried out by simultaneously reacting all the reactants and catalyst, but wherein the reaction is interrupted before a thermoset composition is produced. Instead, this first reaction produces a normally solid (i.e., solid at room temperature), fusible composition (such as is often referred to as a "B-stage" material) that is capable of being transformed by the application of heat into a thermoset composition. Alternatively, the two-stage process can be carried out by first pre-reacting all or some of the reactants to produce a prepolymer, followed by contacting the prepolymer with the catalyst and any remaining reactants to form an isocyanurate. Again, however, the isocyanurate production is interrupted prior to the production of a thermoset composition, to produce a B-stage composition that can subsequently be transformed into a thermoset composition by the application of heat.

The alkylene oxide condensates of the novolak resins that are employed in the invention are well known to those skilled in the art (e.g., see British Pat. No. 1,029,033), as are the novolak resins per se. It is known that the novolak resins are readily produced by the reaction of a phenol with, for example, formaldehyde. The phenol-formaldehyde resins are known to exist as A-stage, B-stage and C-stage resins, with the C-stage resin being highly crosslinked and insoluble and infusible. For the purposes of this invention, the fusible A- and B-stage novolak resins are employed in the production of the alkylene oxide condensates. It is also known that the novolak resins can be produced using substituted phenols and that other aldehydes can be used instead of or in addition to formaldehyde. All of these are known, as are the methods by which they are produced, and for the purposes of this invention the term novolak includes any of the known resins.

The reaction of the novolak resin with an alkylene oxide is readily carried out in the presence of a suitable catalyst. This reaction is well known and does not require extensive discussion herein to enable one skilled in the art to produce these compounds. Any of the alkylene oxide compounds can be used in the production of these condensates. The preferred, however, are the aliphatic alkylene oxides containing up to four carbon atoms. The most preferred are ethylene oxide, propylene oxide, or mixtures thereof.

A particularly preferred condensate is the product formed by condensing propylene oxide, ethylene oxide, or mixture thereof with the novolak produced by the reaction of phenol with formaldehyde. This phenolformaldehyde novolak is a composition that contains the recurring unit that can be represented by the structural formula:

I 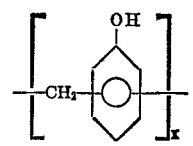

in which $x$ represents a number having an average value of at least about two to about 10. The preferred compounds are those in which $x$ has an average value from about 2.5 to about 8. While, for simplicity, Formula I depicts the preferred novolak as being composed of divalent units, it is, of course, understood that the terminal units are monovalent and that some of the units may be polyvalent, e.g., trivalent.

In the reaction of the phenol-formaldehyde novolak resin with the alkylene oxide, there is produced an alkylene oxide condensate that can be represented by the formula:

II 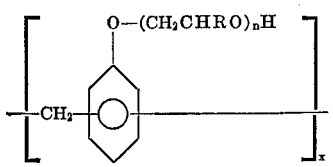

wherein $x$ is as defined above with respect to Formula I, wherein R can be hydrogen or methyl, and wherein $n$ is a number having an average value of at least 1, and up to about 20 or more. Preferably, $n$ represents a number having an average value of from at least 1 to about 12.

The alkylene oxide condensates of novolak resins are reacted with an organic polyisocyanate. Any of the known organic polyisocyanates can be used. Illustrative thereof are the alkylene diisocyanates, such as tetramethylene diisocyanate, pentamethylene diisocyanate, and hexamethylene diisocyanate; cycloalkylene diisocyanates, such as cyclohexylene-1,3-diisocyanate, and cyclohexylene-1,4-diisocyanate; aromatic diisocyanates, such as $m$-phenylene diisocyanate, $p$-phenylene diisocyanate, polymethylene polyphenylisocyanate (i.e., the product produced by phosgenation of an anilineformaldehyde condensation product), 2,4-tolylene diisocyanate, 2,6-tolylene diisocyanate, naphthalene-1-4-diisocyanate, diphenylene-4,4′ - diisocyanate, bis (4 - isocyanatophenyl) methane ("MDI"), bis(3-methyl-4-isocyanatophenyl)methane and 4,4′-diphenylpropane diisocyanate; aliphatic-aromatic diisocyanates, such as xylylene-1,4-diisocyanate and xylylene-1,3-diisocyanate, the polyisocyanates as disclosed in U.S. Pat. No. 2,683,730, as well as the polyisocyanates listed in the publication of Siefken, Annalen, 562, pages 122–135 (1949). Also included are 4,4′-tris (isocyanatophenyl) methane, 3,10 - diisocyanatotricyclo $[5.2.1.0^{2,6}]$decane, bis(2-isocyanatoethyl) carbonate, and bis(2-isocyanatoethyl) fumarate. Preferred organic polyisocyanates include the aromatic polyisocyanates such as tolylene diisocyanate, MDI, and polymethylene polyphenylisocyanate.

Organic polyisocyanates that have been prereacted with a stoichiometric deficiency of an active hydrogen-containing compound can also be employed.

The organic polyisocyanate is employed in the invention in an amount in excess of that required to react with all of the reactive hydrogen-containing compositions present in the reaction mixture. Such reactive hydrogen-containing compositions include the alkylene oxide condensates of novolak resins described hereinabove, one or more additional polyols which may be employed if desired, and reactive blowing agents such as water, which can be employed if a foam is desired. To illustrate the proportions that are employed, normally the organic polyisocyanate will be employed in amounts such that there are at least abount 1.2, and preferably from about 1.5 to about 5, equivalents of isocyanato group per equivalent of reactive hydrogen.

The thermoset compositions of the invention can be prepared by (1) pre-reacting all or part of the alkylene oxide condensate of a novolak with the organic polyisocyanate to form a prepolymer, followed by contacting this prepolymer with a catalyst that promotes the formation of isocyanurate from isocyanate, or (2) a one-step reaction in which the condensate and polyisocyanate are reacted in a reaction mixture that also contains the catalyst. Because the said condensates are often very viscous, it may be desirable in some cases to employ a diluent in the reaction mixture, especially when a prepolymer is being formed prior to contacting with the catalyst. Such diluent can be a non-reactive diluent such as a non-reactive blowing agent (e.g., a fluorocarbon such as fluorotrichloromethane) or a solvent such as methylene chloride, or a reactive diluent such as a low viscosity polyol. Illustrative low viscosity polyols include polypropylene glycol having a molecular weight of about 2000 and poly(epsilon-caprolactone) having a molecular weight of about 530.

Among the catalysts that can be employed to promote the formation of isocyanurate from isocyanate are the alkali metal mercaptides, which are disclosed in applicants' copending application Ser. No. 238,588, the disclosure of which is incorporated herein by reference. The alkali metal mercaptides can contain a single mercaptide group in the molecule, or they can have larger numbers thereof. The mercaptide can be aliphatic, aromatic, heterocyclic, cycloaliphatic or polymeric in nature. The nature of the mercaptide compound is not the controlling factor; the presence in the molecule of the —SM group is the factor which imparts catalytic activity to the molecule. Thus, in the broadest sense the catalysts can be defined by the formula:

III $\qquad X(SM)_n$ wherein X is the organic moiety to which the —SM group is attached, and $n$ is a number having a positive value which can be as high as six, and even higher in polymeric substances. The organic moiety X can be an unsubstituted or substituted monovalent or polyvalent group. Thus, it can be a monovalent alkyl group of from 1 to 20 carbon atoms, or an alkenyl group of from 2 to 20 carbon atoms, or an aryl or alkaryl or aralkyl group of from 6 to 10 carbon atoms, or a cycloalkyl or cycloalkenyl group of from 5 to 6 carbon atoms, or a heterocyclic group containing ring carbon atoms and nitrogen or sulfur or oxygen ring atoms which ring can have 5 or 6 members; or, it can be a polyvalent radical of any of said groups when there are two or more —SM groups attached to the X moiety. It can also be a polymer chain to which the —SM groups are attached.

Illustrative of suitable alkali metal mercaptides are sodium n-butylmercaptide, lithium sec-butylmercaptide, sodium hexylmercaptide, lithium decylmercaptide, lithium dodecylmercaptide, sodium 2-hydroxethylmercaptide, sodium 14-hydroxytetradecylmercaptide, sodium carboxymethylmercaptide, lithium 2-carboxyethylmercaptide, lithium 9-carboxynonylmercaptide, lithium 4-hexenylmercaptide, sodium phenylmercaptide, lithium phenylmercaptide, potassium phenylmercaptide, lithium 1-naphthylmercaptide, sodium triphenylmethylmercaptide, sodium 4-chlorophenylmercaptide, sodium tolylmercaptide, lithium xylylmercaptide, sodium cyclohexylmercaptide, and 1,3,4-thiadiazole-2,5-di(sodiomercaptide). Also suitable are the alkali metal salts of 2-mercaptobenzothiazole, octane dithiol, and the reaction product of sodium sulfide with oligomers of epichlorohydrin as well as poly(alpha-mercaptomethyl ethylene oxide).

Any alkali metal mercaptide having at least one mercaptide group in the molecule can be used, including the monomercaptides and polymercaptides, provided that there are no substituents in the molecule that will unduly interfere with the reaction of the isocyanato group and formation of the isocyanurate group. The mercaptides are characterized by the presence in the molecule of at least one mercaptide group of the formula —SM, wherein M is an alkali metal atom such as lithium, sodium or potassium. The simplest mercaptides are those containing only one such group. However, the compounds suitable for use can contain as many as six or more mercapto or mercaptide groups in the molecule. There can also be present in the mercaptide molecule other substituent groups, such as carboxyl, hydroxyl, halogen, ester linkages, ether linkages, amido linkages, or any other group which would not exert a deterring effect on the reaction.

The alkali metal mercaptide catalyst is used at a concentration of from about 0.01 to about 10 mole percent, and preferably from about 0.5 to 5 mole percent, the percentage being based upon total equivalents of isocyanate employed in the process. Any catalytic amount sufficient to catalyze the reaction can be employed.

A solvent for the catalyst can be used and for this purpose a suitable organic solvent can be employed. As examples of useful solvents dimethylformamide, dimethylsulfoxide, sulfolane, diethylene glycol, dioxane, and tetrahydrofuran are illustrative.

The alkali metal mercaptides are readily prepared by known methods, one of which is the reaction of the alkali metal or the alkali metal hydride with the organic mercaptan, preferably in solution. The said solution can be used directly in the process of the invention.

In addition to, or in place of, the abovedescribed alkali metal mercaptides, other catalysts can be employed to promote the formation of isocyanurate from isocyanate. Such other catalysts include an organic orthoborate plus an alcoholate or phenolate as disclosed in U.S. Pat. No. 3,697,485, and a strong base such as a tertiary amine plus an epoxide as disclosed in U.S. Pat. No. 3,211,703.

The invention can be employed to produce solid elastomeric products, surface coatings, cast objects, molded objects, fiber-reinforced objects, or flexible, semi-flexible, semi-rigid or rigid foams. All of these types of product and their specific utilities are well known commercially, and those skilled in the art are familiar with the reactants and techniques necessary to produce a particular type of product. Thus, it is known that flexible products are obtained in the absence of highly functional crosslinkers or in the absence of large amounts of polyols and polyisocyanates having functionalities greater than two. It is also known that as the functionality of the reactants is increased the rigidity of the final product increases. In addition, it is known that the inclusion of a foaming agent will produce a foam while the exclusion of such agent will result in a solid nonfoamed product.

Along with the alkylene oxide condensates of novolak resins, conventional polyols can be employed in the invention. These are so well known in the art that they do not require a detailed and elaborate description herein. However, as illustrative thereof, one can mention the following types:

(a) Polyoxyalkylene polyols including the adducts of alkylene oxides with, for example, water, ethylene glycol, propylene glycol, glycerol, 1,2,6-hexanetriol, 1,1,1-trimethylolpropane, pentaerythritol, sorbitol, sucrose, alpha-methylglucoside, alpha-hydroxyalkylglucoside, ammonia, triisopropanolamine, ethylenediamine, phosphoric acid, polyphosphoric acids such as tripolyphosphoric acid, and phenol-aniline-formaldehyde ternary condensation products. The alkylene oxides employed in producing the polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acids such as those prepared by the reaction of an excess of ethylene glycol, propylene glycol, or glycerol, with phthalic acid or adipic acid.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol.

(d) Phosphorus-containing derivatives such as tris(dipropylene glycol) phosphite and other phosphites.

(e) The polymer/polyols produced by the in situ polymerization of a vinyl monomer in a polyol, as disclosed in U.S. 3,304,273, U.S. 3,383,351 and U.S. 3,523,093.

The foregoing are merely illustrative and represent only a small number of the many polyols known in the art that can be employed with the alkali metal mercaptide catalysts in the process of this invention.

The alkylene oxide condensate of a novolak resin, or mixture thereof with one or more other polyols, that is employed in the invention can have a hydroxyl number which can vary over a wide range. In general, the hydroxyl number of the polyol or polyol mixture employed can range from about 20, and lower, to about 1000, and higher, preferably from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{m.w.}$$

where

OH = hydroxyl number of the polyol
$f$ = average functionality, that is, the average number of hydroxyl groups per molecule of polyol
m.w. = average molecular weight of the polyol The exact polyol employed depends upon the end-use of the polyurethane-isocyanurate product. The molecular weight and the hydroxyl number are selected properly to result in flexible, semi-flexible, or rigid products. The polyol or polyol mixture usually possesses a hydroxyl number of from about 200 to about 1000 when employed in producing rigid products, from about 50 to about 250 for semi-flexible products, and from about 20 to about 70 or more when employed to produce flexible products.

When a foam is desired, foaming can be accomplished by employing a minor amount (for example, from about 0.5 to 25 weight percent, based on total weight of the reaction mixture), of a blowing agent which is vaporized by the exotherm of the isocyanato-reactive hydrogen reaction. Preferred vaporizable blowing agents include halogen-substituted aliphatic hydrocarbons which have boiling points between about −40° C. and 70° C., and which vaporize at or below the temperature of the foaming mass, for example, trichloromonofluoromethane, dichlorodifluoromethane, and methylene dichloride. Other useful blowing agents include water and low-boiling hydrocarbons such as butane, pentane, hexane, cyclohexane, and the like. Other gases or compounds easily volatilized by the exotherm of the isocyanato-reactive hydrogen reaction can be employed. A further class of blowing agents includes the thermally unstable compounds which liberate gases upon heating, such as N,N'-dimethyl - N,N' - dinitrosoterephthalamide.

In addition to the catalyst for promoting the production of isocyanurate, one can also have present in the reaction mixture any of the known catalysts previously used in the production of polyurethanes. These can comprise, for example, from 0.05 to 1 weight percent or more of the reaction mixture. Illustrative thereof are:

(a) tertiary amines such as N-methylmorpholine, N-ethylmorpholine, N,N,N',N' - tetramethyl - 1,3 - butanediamine, 1,4 - diazabicyclo[2.2.2]octane and bis[2-(N,N-dimethylamino)ethyl] ether;

(b) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, and metallic driers such as manganese and cobalt naphthenate, and;

(c) organometallic derivatives of tetravalent tin, trivalent and pentavalent As, Sb, and Bi, and metal carbonyls of iron and cobalt.

Small amounts, e.g., about 0.001% to 5.0% by weight, based on the total reaction mixture, of an emulsifying agent can be employed when producing foams. Examples include polysiloxane-polyoxyalkylene block copolymers having from about 10 to 80 percent by weight of siloxane polymer and from 90 to 20 percent by weight of alkylene oxide polymer, such as the block copolymers described in U.S. Pats. 2,834,748 and 2,917,480. Another useful class of emulsifiers is the group of "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer.

The examples set forth below illustrate certain aspects of the invention. All parts and percentages are by weight, unless otherwise stated.

EXAMPLE 1

Production of novolak-propylene oxide condensate

A solution of novolak resin in propylene oxide containing about 2 weight percent catalyst (with respect to novolak) is maintained at 100°–120° C. under autogeneous pressure for 24 hours. Excess propylene oxide is removed by evaporation under reduced pressure. The resulting viscous condensate is washed with water to remove residual catalyst, and is then dehydrated by azeotropic distillation with toluene. Table I, below, sets forth some typical experimental conditions and results.

about 6.57 wt. percent of OH, and toluene diisocyanate ("TDI") (8.7 grams, 0.1 equivalent of NCO) were mixed at 100° C. When the mixture became homogeneous, catalysts consisting of about 0.08 gram (0.6 mole percent with respect to NCO) each of benzyldimethylamine and phenyl glycidyl ether were added, and the mixture was then allowed to stand at 100° C. A hard solid was formed in about ten minutes (no flow was reached in about eight minutes). The reaction was quenched by immersing the vessel which contained the reaction mixture in a Dry Ice-acetone bath. The polymer was then pulverized. A 10 to 20-mil clear and transparent film was compression molded at about 200° C. under a pressure of about 100 p.s.i. for 1 minute followed by a pressure of about 10,000 p.s.i. for 9 minutes. The film retained its shape on removal from the mold without cooling. The film was insoluble in solvents such as a mixture of phenol and tetrachloroethane; dimethylformamide; and halogenated hydrocarbons. No fusion was obtained on attempted remolding of the film. These observations indicate that the composition advanced to a C-stage (thermoset) composition during molding. These films are tough and abrasion resistant materials, and can be employed in utilities requiring such properties.

Preparations of thermoset compositions of varying NCO/OH ratios and of novolak-propylene oxide condensates of different OH contents were carried out in a similar manner, that is, by the two-stage process described above.

TABLE I

| | Novolak | | Propylene oxide | | Catalyst | | Condensate product | |
|---|---|---|---|---|---|---|---|---|
| Run number | Identification[1] | Equiv. of phenolic OH | Parts | Moles | Parts | Iden.[2] | Parts | Percent OH | OH number |
| 1 | A | 3 | 318 | 12 | 696 | DBMA | 0.4 | 6.57 | 22.6 |
| 2 | A | 2 | 212 | 12 | 696 | NaOMe | 1.4 | 4.65 | 15.3 |
| 3 | B | 2 | 212 | 12 | 696 | NaOMe | 1.4 | 5.02 | 16.5 |
| 4 | C | 2 | 212 | 12 | 696 | NaOMe | 1.4 | 4.82 | 11.6 |

[1] Novolak A was made from 63 parts of formaldehyde per 100 parts of phenol. It had an average of 4 to 6 phenol moieties per molecule. Novolak B—66 parts of formaldehyde per 100 parts of phenol. Average of 6 to 8 phenol moieties per molecule. Novolak C—67.5 parts of formaldehyde per 100 parts of phenol. Average 7 to 9 phenol moieties per molecule.
[2] BDMA=Benzyldimethylamine; NaOMe=Sodium methoxide.

EXAMPLE 2

Production of B-stage polyurethane-isocyanurate thermoset compositions

Novolak-propylene oxide condensate No. 1 (from Example 1) (5.5 grams, 0.024 equivalent of OH) containing The experiments are summarized in Table II. The catalyst employed in each sample was a mixture of phenyl gylcidyl ether and benzyldimethylamine. In the Table, the mole percent of catalyst refers to each constituent of the catalyst mixture.

TABLE II
Polyisocyanurates from novolak-propylene oxide condensate and TDI

| Sample number | Condensate designation | Grams of condensate | TDI, grams | (NCO)/(OH), moles | Catalyst mole percent of NCO | Reaction temp., °C. | No flow time mins |
|---|---|---|---|---|---|---|---|
| 1 | A | 2.1 | 3.25 | 3 | 0.5 | 100 | 11 |
| 2 | A | 3.1 | 2.18 | 2 | 0.8 | 100 | 1 |
| 3 | A | 12.4 | 6.5 | 1.5 | 1.0 | 70 | 2–3 |
| 4 | B | 10.9 | 5.2 | 2 | 0.8 | 70 | 2 |
| 5 | D | 10.2 | 5.2 | 2 | 1.0 | 70 | 2 |
| 6 | C | 12.9 | 7.8 | 1.5 | 0.7 | 70 | 3 |
| 7 | E | 10.9 | 5.2 | 2 | 1.0 | 70 | 1–2 |
| 8 | F | 9.72 | 5.2 | 2 | 1.0 | 70 | 1–2 |

NOTE:
A=Novolak—propylene oxide condensate containing 6.57 weight per cent of OH. The novolak was prepared from 63 parts of formaldehyde per 100 parts of phenol. The values of $x$ and $n$ from Formula II were 5.7 and 2.4, respectively.
B=Novolak—propylene oxide condensate containing 4.6 weight per cent of OH. The novolak was prepared from 63 parts of formaldehyde per 100 parts of phenol. $x$ was 5.7; $n$ was 4.5.
C=Novolak—propylene oxide condensate containing 7.86 weight per cent of OH. The novolak was prepared from 63 parts of formaldehyde per 100 parts of phenol. $x$ was 5.7; $n$ was 2.
D=Novolak—propylene oxide condensate containing 5.02 weight per cent of OH. The novolak was prepared from 66 parts of formaldehyde per 100 parts of phenol. $x$ was 6.7; $n$ was 4.
E=Novolak—propylene oxide condensate containing 4.82 weight per cent of OH. The novolak was prepared from 67.5 parts of formaldehyde per 100 parts of phenol. $x$ was 7.4; $n$ was 4.25.
F=Novolak—propylene oxide condensate containing 5.26 weight per cent of OH. The novolak was prepared from 68.2 parts of formaldehyde per 100 parts of phenol. $x$ was 7.8; $n$ was 3.75.

Representative properties of the thermoset compositions whose production is set forth in Table II are displayed below in Table III. Table III also displays the values for $x$ and $n$ from Formula II for each condensate, as well as the ratio of isocyanate to hydroxyl (NCO/OH) in the reaction mixture.

TABLE III

| Sample | $x$ | $n$ | NCO/OH | Tensile modulus, p.s.i. | Tensile strength, p.s.i. | Percent elongation | $T_g$, °C. | Pendulum impact, foot-lbs./cubic inch |
|---|---|---|---|---|---|---|---|---|
| 1 | 5.7 | 2.4 | 3 | 280,000 | 10,000 | 5.5 | 170 | 7.3 |
| 2 | 5.7 | 2.4 | 2 | 236,000 | 7,800 | 4.0 | 124 | 7.7 |
| 3 | 5.7 | 2.4 | 1.5 | 300,000 | 12,000 | 5.5 | 76 | 9 |
| 4 | 5.7 | 4.5 | 2 | 275,000 | 8,300 | 4.5 | 64 | 10 |
| 5 | 6.7 | 4 | 2 | 330,000 | 7,700 | 3.0 | 68 | 12 |
| 6 | 5.7 | 2 | 1.5 | 416,000 | 9,000 | 2.5 | 106 | 6 |
| 7 | 7.4 | 4.25 | 2 | 205,000 | 3,500 | 2.0 | 80 | 6.5 |
| 8 | 7.8 | 3.75 | 2 | | Not fully cured | | | |

The foregoing Example 2 illustrates one way of carrying out the two-stage process of the invention. As a general rule, the slower catalysts, such as the tertiary amine-epoxy system illustrated in Example 2, are preferred for the two-stage process. When using such catalysts, an elevated temperature of the order of 70° to 100° C. is employed to initiate the reaction of isocyanate to form isocyanurate groups. The reaction, once initiated, is exothermic, and additional heating is not required. To form a B-stage material, the reaction is quenched to a low temperature, e.g., below 0° C. The B-stage material is then cured by heating to an elevated temperature of the order of 190° to 200° C. for a period of at least about 5 minutes. Normally, pressure is required to cause the B-stage material to flow. Initially, a low pressure is desirable, such as a pressure of 50 to 150 p.s.i. for about 1 minute, followed by high pressure, e.g., 1000 p.s.i. or more, for the remainder of the cure.

The B-stage material can be pulverized to form a powder, which can be shaped to form molded articles. If desired, reinforcing fibers, fillers, and pigments can be mixed in with the B-stage material.

If the faster catalysts, such as the alkali metal mercaptides, are employed in the two-stage process, heating is not required in order to initiate the formation of isocyanurate from isocyanate, although moderate heat (e.g., 60° to 100° C.) is often employed in order to reduce the viscosity of the novolak-alkylene oxide condensate. Quenching to a low temperature (0° C., or below) is carried out shortly after the catalyst has been added to the reaction mixture, for instance, from one-half to 2 minutes after the initiation of the reaction. The B-stage material is then cured in a similar manner to that described above with respect to the slower catalysts, except that lower temperatures (e.g., as low as about 100° C.) may be employed.

The remarks above concerning the two-stage process apply when the reactants and catalyst are all mixed together at one time, as well as when the process is carried out by first forming an isocyanato-terminated prepolymer.

EXAMPLE 3

Preparation of fiber-reinforced composites (1) *Preparation of Isocyanate-Capped Prepolymer.*—A novolak-propylene oxide condensate ($x$ and $n$ from Formula II were 5.7 and 2.4, respectively) (74.4 grams, 0.3 equivalent of OH) that was warmed to 60°–80° C. to reduce its viscosity, was added to toluene diisocyanate (78 grams, 0.9 equivalent of NCO) at room temperature. A slight exotherm was noted. The reaction mixture was cooled in a water bath and allowed to stand at room temperature for sixteen hours.

(2) *Glass Fiber-Reinforced Composites.*—Milled glass fiber (30 grams) and 36 grams of the above-described prepolymer were blended in a Brabender mixer at room temperature until the mixture was uniform. Benzyldimethylamine (0.19 grams) and phenyl glycidyl ether (0.24 grams) were then added and the mixture was further mixed. The resulting uniform mixture was then compression molded under the same molding conditions described above in Example 2 to yield fiber glass reinforced plaques which were removed from the mold without cooling.

(3) *Sisal-Reinforced Composites.*—In a similar manner, a composite was prepared from 38 grams of the prepolymer and 30 grams of sisal.

(4) *Asbestos-Reinforced Composites.*—Compression molded plaques were prepared from 30 grams of prepolymer and 30 grams of asbestos in the manner described above.

EXAMPLE 4

Cast polyisocyanurates from novolak-propylene oxide condensate and isocyanates (1) A novolak-propylene oxide condensate ($x$ was 5.7; $n$ was 4.5) (5.5 grams, 0.015 equivalent of OH) containing 0.2 milliliter of a 1M solution of lithium thiophenoxide in dimethylformamide was degassed at 70° C. by evacuation at about 100 mm. Hg. Toluene diisocyanate (2.94 grams, 0.02 equivalent of NCO) was then added by a syringe directly into the reaction mixture, and the mixture was mixed with a stirring rod. No flow was observed in less than one minute, and after about two minutes, a solid product was obtained shaped in a rod conforming to the shape of the reaction vessel.

(2) In a similar manner, a cast product was obtained from a novolak-propylene oxide condensate ($x$=5.7; $n$=4.5) (5.5 grams, 0.015 equivalent of OH), 0.2 milliliter of a 1M solution of lithium thiophenoxide, and bis(4-isocyanatophenyl)methane (3.75 grams, 0.03 equivalent to NCO). No flow was observed at about less than one minute.

(3) A novolak-propylene oxide condensate ($x$=5.7, $n$=4.5) (5.5 grams, 0.015 equivalent of OH) containing 0.2 milliliter of a 1M solution of lithium thiophenoxide in dimethylformamide was degassed at 100° C. by evacuating at about 100 mm. Hg. A polymethylene polyphenyl isocyanate (2.94 grams, 0.02 equivalent of NCO) was added directly to the reaction mixture by a syringe. The mixture was mixed at 100° C. No flow was observed at less than two minutes, and after eight minutes, a cast product was obtained in the shape of the reaction vessel.

The foregoing Examples 3 and 4 illustrate the process of the invention when carried out as a one-stage process. When using the fast catalysts such as alkali metal mercaptides, heating is not required, although it may be employed as a means for reducing the viscosity of the novolak-alkylene oxide condensate. When using the slower catalysts, heating to a moderately elevated temperature (e.g., 70° to 100° C.) is usually employed to initiate the reaction. In order to achieve essentially complete reaction with either fast or slow catalysts, a post-cure is often employed at elevated temperatures of, for example, up to 200° C. for a period of from about 5 to 30 minutes.

EXAMPLE 5

As a general rule, more flexible products are obtained with longer polyoxyalkylene ether chains in the alkylene oxide-novolak condensates and with lower isocyanate to hydroxyl ratios. Conversely, shorter polyether chains and higher NCO/OH ratios lead to harder, less flexible products.

In order to illustrate the practical application of these principles, a number of polyurethane-isocyanurate thermoset compositions were made from tolylene diisocyanate (TDI) and propylene oxide condensates of a phenol-formaldehyde novolak having an average of 5.7 phenol moieties per molecule (i.e., $x$ in Formula II is 5.7). The condensates had varying polyether chain lengths, and varying NCO/OH ratios were used. The data are presented below in Table IV.

Sample Nos. (a) through (e) and (h) were prepared by the two-stage process using benzyldimethylamine and phenyl glycidyl ether catalysts that was illustrated in Example 2. (In fact, Samples (c), (d), (e) and (h) are Sample Nos. 1, 2, 3 and 4, respectively, of Example 2.) Sample Nos. (f), (g) and (i) through (k) were solution cast by a one-stage process. Sample No. (f) was solution cast onto glass from a 30-percent solids solution in dioxane. 7 grams of condensate (0.025 equivalents of OH) and 4.4 grams of TDI (0.05 equivalents of NCO) were employed. The catalyst was 0.25 milliliters (0.25 millimoles) of 1M solution of lithium p-chlorophenyl mercaptide in dioxane. The cast solution was placed in a 100° C. oven for 30 minutes to volatilize the solvent and cure the film. Sample (j) was produced in the same manner.

Sample (g) was also solution cast onto glass from a solution containing 14 grams of condensate (0.05 equivalent of OH), 8.8 grams of TDI (0.1 equivalent of NCO) and 0.1 gram of stannous di(octyl sulfide), i.e., $$Sn(C_8H_{17}S)_2$$

The cure was the same as in Sample No. (f). Sample Nos. (i) and (k) were produced in the same manner as Sample (g).

TABLE IV

| Sample | Polyether chain length, $n$ | NCO/OH ratio | Tensile modulus, p.s.i. | Tensile strength, p.s.i. | Percent elongation | Tg, °C. | Pendulum impact, foot-lbs./cubic inch |
|---|---|---|---|---|---|---|---|
| a | 2 | 1.5 | 416,000 | 9,000 | 2.5 | 106 | 6 |
| b | 2.2 | 4 | 345,000 | 9,000 | 3.0 | 175 | 5 |
| c | 2.4 | 3 | 280,000 | 10,000 | 5.5 | 170 | 7.3 |
| d | 2.4 | 2 | 236,000 | 7,800 | 4.0 | 124 | 7.7 |
| e | 2.4 | 1.5 | 300,000 | 12,000 | 5.5 | 76 | 9 |
| f | 2.9 | 2.0 | 375,000 | 9,600 | 3 | 55 | 55 |
| g | 2.9 | 2.0 | 288,000 | 8,100 | 5 | 50 | 41 |
| h | 4.5 | 2.0 | 275,000 | 8,300 | 4.5 | 64 | 10 |
| i | 12 | 2 | 800 | 210 | 48 | −36 | 92 |
| j | 4.5 | 2 | 210,000 | 6,600 | 5 | | 50 |
| k | 4.5 | 2 | 21,000 | 2,700 | 80 | 17 | 188 |

What is claimed is:

1. A normally solid, fusible composition capable of being transformed into a thermoset composition by subjecting said fusible composition to heat, wherein said fusible composition comprises the reaction product of (a) an alkylene oxide condensate of a novolak, (b) a stoichiometric excess of an organic polyisocyanate, and (c) a catalytically effective quantity of a catalyst for promoting the formation of isocyanurate from isocyanate, wherein the reaction is interrupted by cooling before reaching thermoset stage.

2. The normally solid, fusible composition of claim 1 wherein said novolak is a condensation product of phenol and formaldehyde.

3. The normally solid, fusible composition of claim 2 wherein said alkylene oxide has from 2 to 4 carbon atoms.

4. Process which comprises the steps of (1) reacting (a) an alkylene oxide condensate of a novolak, with (b) a stoichiometric excess of an organic polyisocyanate, to form a composition containing urethane groups and isocyanate groups, (2) contacting said composition with a catalytically effective amount of a catalyst for promoting the reaction of isocyanate to form isocyanurate groups, provided that step (2) is carried out for a period of time insufficient to produce a thermoset composition, (3) cooling the product of step (2) to a temperature low enough to stop significant further reaction, to produce thereby a normally solid, fusible composition, and (4) subjecting said fusible composition to heat in order to produce a thermoset composition containing both urethane groups and isocyanurate groups.

5. Process which comprises the steps of (1) reacting (a) an alkylene oxide condensate of a novolak, with (b) a stoichiometric excess of an organic polyisocyanate, in the presence of (c) a catalytically effective amount of a catalyst for promoting the formation of isocyanurate groups from isocyanate groups, provided that step (1) is carried out for a period of time insufficient to produce a thermoset composition, (2) cooling the product of step (1) to a temperature low enough to stop significant further reaction, to produce thereby a normally solid, fusible composition, and (3) subjecting said fusible composition to heat in order to produce a thermoset composition containing both urethane groups and isocyanurate groups.

References Cited

UNITED STATES PATENTS 3,745,133    7/1973    Comunale    260—2.5 AW
3,723,367    3/1973    Chow    260—2.5 AB

FOREIGN PATENTS 934,629    8/1963    Great Britain    260—2.5 AP

DONALD E. CZAJA, Primary Examiner

C. W. IVY, Assistant Examiner

U.S. Cl. X.R.

260—2.5 AP, 2.5 AW, 37 N, 38, 77.5 NC